June 25, 1968     M. P. MATTHEW     3,389,658
DOCUMENT POSITIONING AND FEEDING CONTROL FOR PRINTERS
Filed Feb. 18, 1966     3 Sheets-Sheet 1
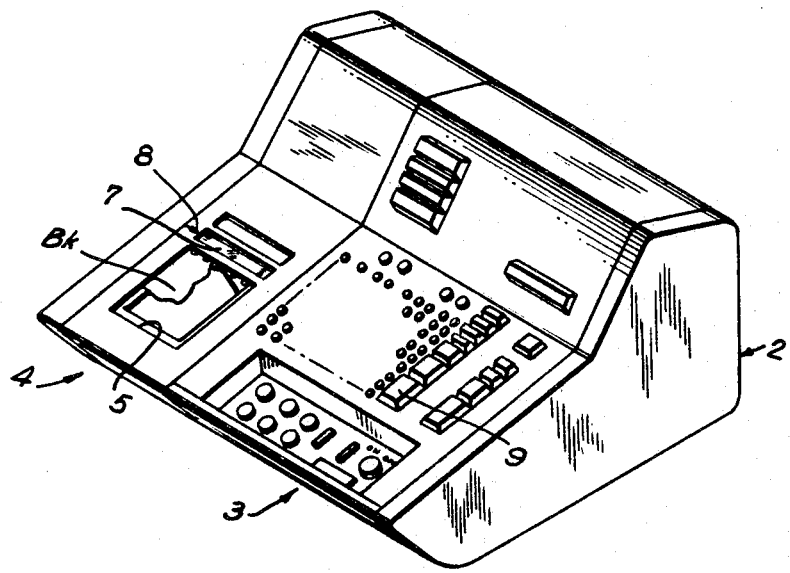
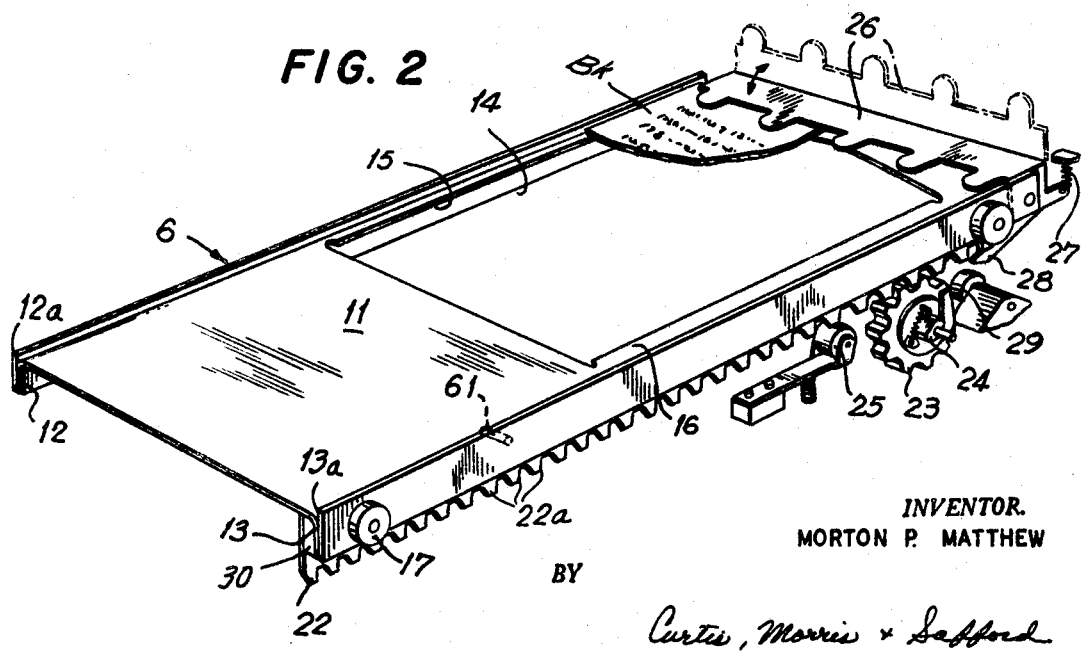
INVENTOR.
MORTON P. MATTHEW
BY
ATTORNEYS

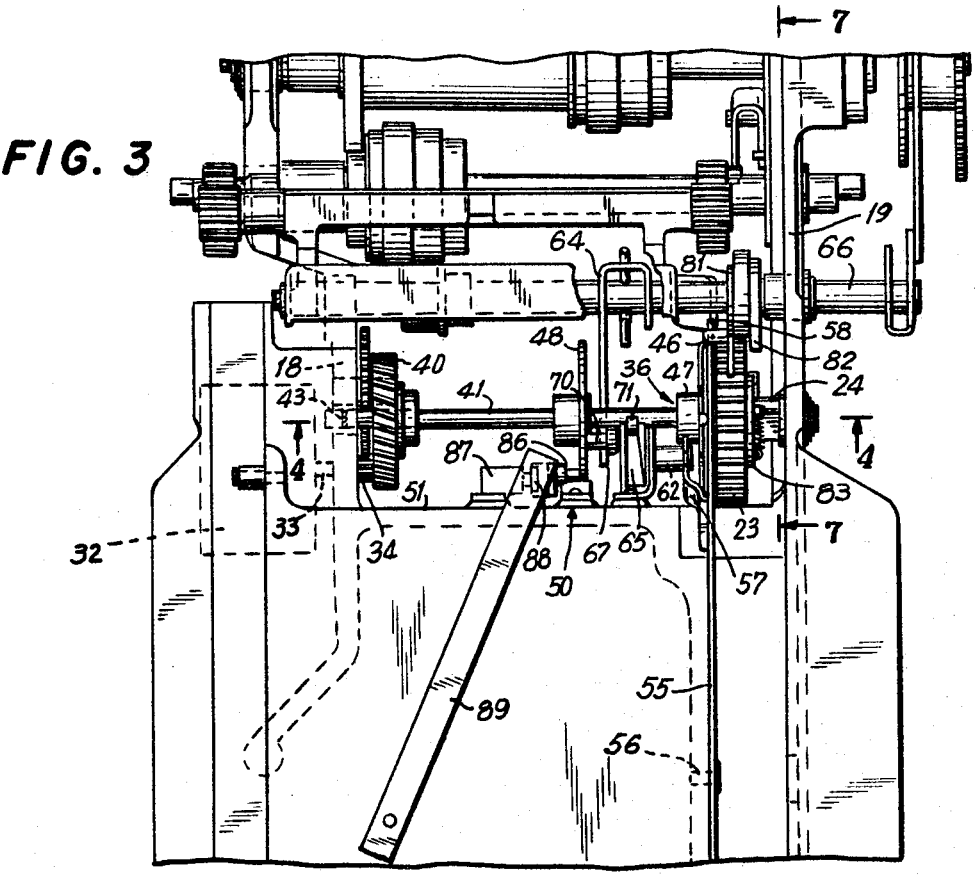
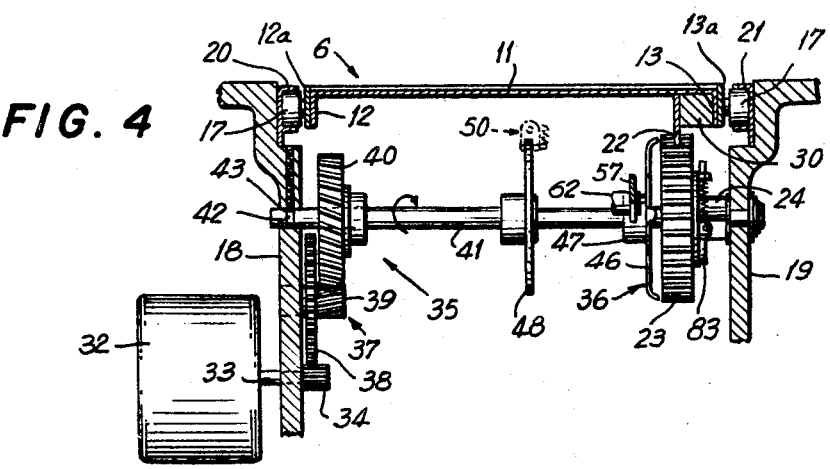
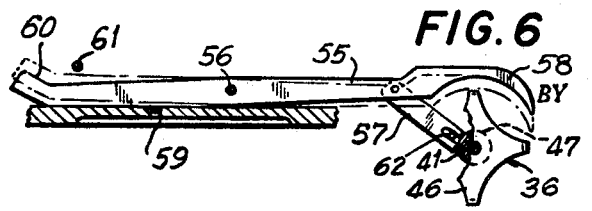

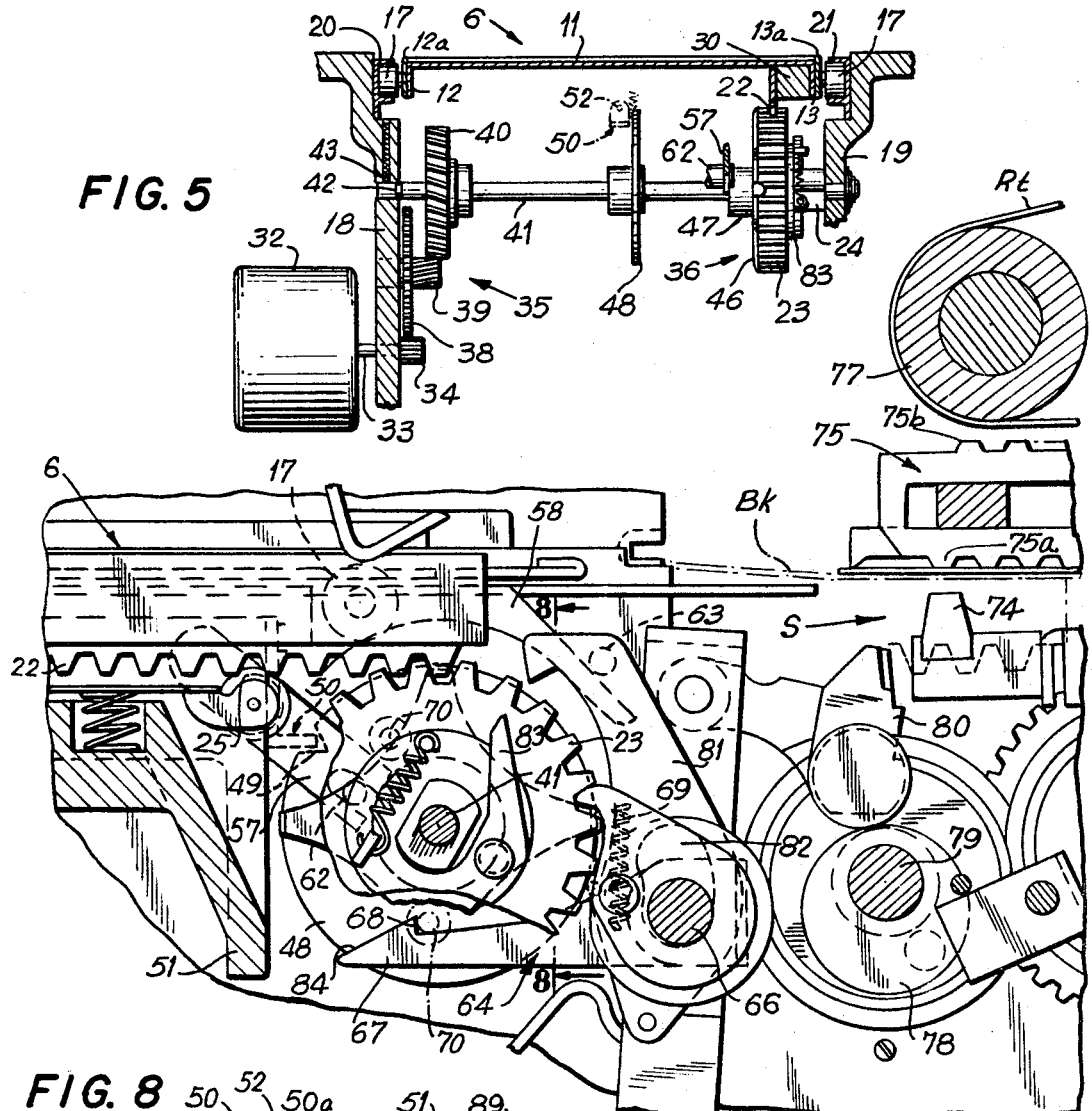
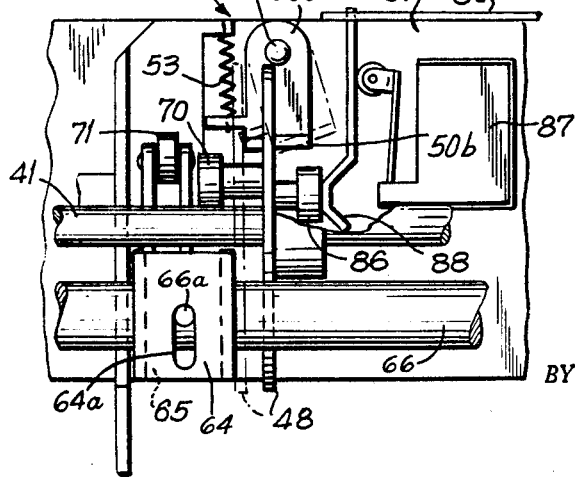
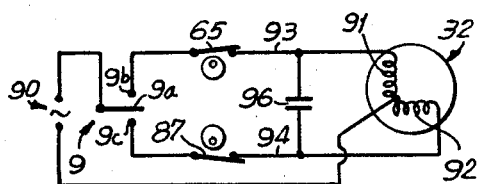
INVENTOR.
MORTON P. MATTHEW
ATTORNEYS

United States Patent Office 3,389,658
Patented June 25, 1968

3,389,658
DOCUMENT POSITIONING AND FEEDING
CONTROL FOR PRINTERS
Morton P. Matthew, Norwalk, Conn., assignor to Bunker-Ramo Corporation, Stamford, Conn.
Filed Feb. 18, 1966, Ser. No. 528,427
13 Claims. (Cl. 101—287)

ABSTRACT OF THE DISCLOSURE

A printer, the carriage of which may be initially positioned under manual control and which may be advanced a fixed distance to a printing position by engaging a clutch in response to the energization of a prime mover. When the carriage has been advanced a predetermined distance to the desired position the carriage is automatically stopped. When printing is completed, the prime mover is reenergized to return the carriage to a home position. The stopping of the carriage at its home position results, through appropriate hardware, in the disengaging of the clutch permitting the carriage to again be positioned under manual control.

The present invention relates to a printer and more particularly to an improved construction and arrangement of elements for supporting and positioning a document or record sheet at a printing station in a printer.

Machines for printing documents in the form of flat record sheets often move the documents being printed through a number of positions. For example, a document is generally inserted in the machine, moved to one of a series of positions for printing and then expelled from the machine. The present invention relates to an improved carriage and operating mechanism for moving such documents to a printing station in a printer. While the carriage and operating mechanism of the present invention may have other applications, it is particularly adapted for use in printers of the type shown and described in the United States Letters Patent issued to Frank Buchsbaum et al. No. 3,146,702 issued Sept. 1, 1964. For purposes of description the printer in said patent may be considered as a part of this application for details of a printer in which the carriage and control of the present invention could be used.

One of the objects of the present invention is to provide an improved construction and arrangement of elements in a printer which facilitates the insertion and gripping of a document or other record sheet to be printed and the proper positioning of the document at a printing station.

Another object is to provide a carriage for properly positioning a document to be printed at a printing station which permits unrestricted movement of the document to an adjusted position to insure uniformity of printed lines and eliminates any danger of pinching the operator's fingers.

Still another object is to provide an improved carriage which is of simple and compact construction, flexible in operation, economical to manufacture and one which is reliable in operation.

These and other objects will become more apparent from the following description and drawings in which like reference characters denote like parts through the several views. It is to be expressly understood, however, that the drawings are for the purpose of illustration only and are not a definition of the limits of the invention, reference being had for this purpose to the appended claims.

In the drawings:
FIGURE 1 is a perspective view of a business machine having a printer incorporating the novel features of the present invention;

FIGURE 2 is a perspective view of the carriage for supporting a document to be printed and showing the depending rack teeth and intermeshing spur gear for moving the carriage;

FIGURE 3 is a plan view of the printer with the carriage removed to show the driving and control means for moving the carriage and document thereon to a printing station;

FIGURE 4 is a transverse sectional view taken on line 4—4 of FIGURE 3 and showing the helical gears and timing disc for actuating the clutch into and out of driving engagement with the spur gear for actuating the carriage;

FIGURE 5 is a view similar to FIGURE 4 showing the clutch engaged;

FIGURE 6 is a detail view of the locking bar for holding the clutch engaged during a printing operation;

FIGURE 7 is a sectional view taken on line 7—7 of FIGURE 3 to show the latch for controlling the forward movement of the carriage and the indexing mechanism for advancing the carriage, line by line, at a printing station;

FIGURE 8 is a sectional view taken on line 8—8 of FIGURE 7 to show the detent for engaging the timing disc and the limit switch for controlling the return movement of the carriage; and FIGURE 9 is a simplified electric circuit for controlling the motor for operating the carriage.

Referring now to the drawings, FIGURE 1 illustrates a business machine 2 having a keyboard 3 and printer 4 arranged in side by side relationship in a single unit or console. While the machine 2 may have other applications, the one illustrated is particularly adapted for use with systems as described in the Buchsbaum et al. Patent No. 3,146,702 for keeping a perpetual inventory such as the accounts of customers in a savings bank. When used in such a system, each teller would be provided with a unit 2, as illustrated in FIGURE 1, which would be connected to a computer having a memory storage device connected to all of the units as described in said Buchsbaum et al. patent. When a customer requests a particular transaction he delivers his bankbook B$k$ to the teller who inserts it in the printer 4 through an opening 5 in the console and places it on carriage 6, see FIGURE 2. The console has a window opening 7 adjacent the opening 5 and the carriage with the bankbook B$k$ face upward thereon is moved forwardly until the lines of the bankbook can be observed in said window opening and the line to be printed is brought into register with an index point 8. The teller then punches the particular transaction, such as a deposit, withdrawal or interest to be added on the keys of the keyboard 3 and presses a button to select the particular transaction including a button 9 to initiate operation of the machine, perform the transaction and print the results on the bankbook B$k$. The same button 9 may initiate the whole machine as well as advance the bankbook B$k$ to the printing station and operate the printer, or these operations may be performed separately. However, for the purpose of describing the unit 2 as it applies to the present invention, one button 9 is presumed to operate the entire printer 4 to advance the carriage to a printing station, perform a printing operation and then return the carriage to its initial position after the transaction has been completed.

The carriage 6 is in the form of a flat plate 11 having depending sides 12 and 13 with narrow plates 12a and 13a attached thereto and projecting above the walls. The flat plate 11 has a cut-out opening 14 adjacent its forward end and of a size corresponding to the area of the bankbook B$k$ to be printed with guides 15 and 16 at opposite sides of the opening to receive the edges of a bankbook thereon. Projecting from the opposite side walls 12 and 13 of the carriage 6 are rollers 17. As shown most clearly in FIGURE 4, the carriage 6 is mounted between spaced sides 18 and 19 of a frame with the rollers 17 at each side projecting into tracks 20 and 21. Thus, the carriage 6 is mounted to roll along the tracks 20 and 21 in the side walls 18 and 19 of the frame from a fully retracted position where the bankbook Bk is inserted to a printing station where the printing occurs. As thus far described, the printer 4 is substantially the same as that shown and described in the Buchsbaum et al. Patent No. 3,146,702, referred to above.

In accordance with the present invention, the carriage 6 is freely movable in the tracks 20 and 21 of the frame to a particular adjusted position corresponding to a line of bankbook Bk to be printed. After the initial positioning of the carriage 6 the start button 9 is pressed to initiate operation of a prime mover which operates through a driving mechanism and clutch to move the carriage forwardly a predetermined distance automatically and thereby register the particular line of the bankbook Bk to be printed with aligned type characters at a printing station. After completion of the printing operation, with an indexing of the carriage forwardly in increments corresponding to a line of the bankbook Bk as required for subsequent entries, the carriage is automatically returned to its initial fully retracted position.

The carriage 6 has a rack 22 attached to the inner face of side 13 with a spacer strip 30 therebetween and the rack has teeth 22a depending from the carriage below the lower edge of the side wall 13 which mesh with a spur gear 23.ABove 23 is journaled on a boss or stub shaft 24 projecting inwardly from the side 19 of the machine frame to freely rotate thereon. Thus, the carriage 6 may be freely slid forwardly and rearwardly on the frame. A spring pressed roller 25 rides on the rack teeth 22a, see FIGURE 2, and acts between adjacent teeth as a detent for yieldingly holding the carriage in any adjusted position including the fully retracted position. A clamp 26 is provided at the forward end of the carriage 6 which is pivotally mounted on the sides 12 and 13 of the frame and is normally rocked to the position illustrated in full lines in FIGURE 2 by spring 27. A rearwardly projecting arm 28 engages a cam 29 at the fully retracted position of the carriage 6 to rock the clamp upwardly to the position illustrated in dash lines so that the end of a bankbook Bk can be inserted thereunder. As soon as the carriage 6 is moved forwardly from its fully retracted position the arm 28 moves away from the cam 29 and the spring 27 rocks the clamp to secure the bankbook Bk to the carriage with the area to be printed overlying the opening 14.

As shown in FIGURES 3 and 4, the prime mover is an electric motor 32 mounted on a suitable support on the side 18 of the machine frame. The prime mover has a shaft 33 projecting through the side of the frame 18 and mounts a pinion gear 34 at its inner end. The prime mover 32 is connected in an electric circuit having switching means operated by the push button 9, and/or other elements of the machine, and limit switches, later to be described in detail, for opening the circuit in the forward and rearward positions of the carriage 6, respectively. In other words, the motor 32 is operated in opposite directions to first move the carriage 6 forwardly to a printing position and then return it to its initial position.

The carriage 6 is driven from the prime mover 32 by a driving mechanism including a step-down gear train 35 and clutch 36. The step-down gear train 35 comprises a compound gear 37 having its larger spur gear 38 meshing with the pinion 34 and a smaller pinion 39 meshing with a larger gear 40 mounted fast on a drive shaft 41. Shaft 41 is journaled in the side 18 of the frame at one end and in a bore in the stub shaft 24 at its opposite end for both rotation and axial movement therein. As shown in FIGURE 4, the drive shaft 41 has an annular groove 42 engaged by a spring press detent 43 when the clutch is disengaged. Clutch 36 is in the form of a star shaped disc having reduced forwardly projecting ends to form claws 46 for engaging the spur gear 23 between its teeth. The clutch 36 has a hub 47 mounted fast on the shaft 41 for axial movement with the shaft to engage and disengage the claws 36 with the teeth of the pinion gear 23.

Shaft 41 is moved axially from the position shown in FIGURE 4 to that shown in FIGURE 5 to engage the clutch 36 by the gears 39 and 40 of the driving mechanism and a timing disc 48 fixed on the shaft 41 as shown most clearly in FIGURE 7. To this end the gears 39 and 40 are helical gears having intermeshing teeth for producing an axial thrust on the drive shaft 41 when the latter is held against rotation by the timing disc 48. The timing disc 48 has a notch 49 formed in its outer periphery which is engaged by a detent 50 on the frame to hold the disc and shaft 41 from rotation until the axial movement of the shaft disengages it from the detent. Thus, when the intermeshing helical gears 39 and 40 are rotated and the shaft is held from rotation, the spiral teeth of the gears produce an axial thrust on shaft 41, to the right as viewed in FIGURE 4, to move the shaft and clutch 36 thereon axially to engage the claws 46 of clutch 36 with the teeth of the gear 23. During such axial movement of the shaft 41, the timing disc 48 slides off the detent 50 which then permits rotation of the shaft 41 and spur gear 23 clutched thereto by clutch element 36. Rotation of the gear 23 acting through the rack 22 moves the carriage 6 forwardly to a printing station. As shown in FIGURES 3 to 8 the detent 50 is in the form of a right angular lug having one flange 50a abutting a cross wall 51 of the frame and a flange 50b projecting forwardly from the cross wall. A pivot pin 52 extends through flange 50a for mounting the lug for rocking movement from the full line to the dash line positions illustrated in FIGURE 8. A spring 53 is connected between one side of the detent lug 50 and the cross wall 51 of the frame for holding the detent in the full line position illustrated in FIGURE 8 while yielding to permit rocking movement to the dash line position.

When the clutch 36 is engaged with the spur gear 23, it is locked in clutching engagement by a locking bar 55, see FIGURES 3 and 6. The locking bar 55 is pivotally mounted on the frame of the machine by a pivot pin 56 substantially midway between its ends and extending through the bar and into the frame. A locking lug 57 depends from the locking bar 55 at a forwardly projecting angle and rests on the hub of the clutch 36 when in its disengaged position as shown in FIGURE 3, but falls behind the hub to lock the clutch engaged when the latter is shifted from the position shown in FIGURE 4 to that shown in FIGURE 5. The forward end of the locking bar 55 has an arcuate section 58 overlying the top of clutch element 36 as shown in FIGURES 3 and 7. A spring 59 acting between the locking bar 55 and frame tends to rock the bar clockwise as viewed in FIGURE 6, to position the depending locking lug 57 at the rear of the hub 47 of clutch 36 as shown in FIGURE 5. The rearward end of the locking bar 55 is provided with a forwardly inclined cam surface 60 engaged by a pin 61 projecting laterally from the carriage 6, see FIGURE 2, which rocks the bar counter-clockwise against the action of the spring 59 to release the clutch plate for axial movement to disengage the spur gear 23. Pin 61 is so located on the carriage 6 as to engage the locking bar 55 as the carriage approaches its fully retracted position after a printing operation. The forwardly projecting arcuate sector 58 at the forward end of the locking bar engages a pin 63 on an indexing pawl 81, later to be described, to hold the pawl disengaged when the carriage is fully retracted. As shown in FIGURES 3 and 6, the locking lug 57 is slotted and straddles a pin 62 on the frame for guiding it into and out of operating position.

The carriage 6 is moved forwardly a predetermined fixed distance by the driving mechanism 35 as controlled by a latch 64 and limit switch 65, see FIGURES 3 and 7. The latch 64 is of sheet metal construction having one end bent back on itself to provide a hub through which rock shaft 66 extends parallel to the drive shaft 41. The rock shaft 66 is journaled in the sides 18 and 19 of the frame and the hub of the latch 64 is connected thereto through a pin and slot connection 66a, 64a, see FIGURE 8. Latch 64 has a rearwardly projecting arm 67 with a latch shoulder 68 formed at its rearward end as shown most clearly in FIGURE 7. A spring 69 acting between the arm 67 and the frame tends to rock the shaft 66 clockwise to the position illustrated. The rearwardly projecting arm 67 of the latch 64 is positioned adjacent the side of the timing disc 48 and the shoulder 68 on the latch is engaged by a pin 70 projecting laterally from the timing disc 48. In the initial position of the timing disc 48 when released by the detent 50 the latching pin 70 is in the radial position illustrated in dotted lines in FIGURE 7. When the timing disc 48 is released by the detent 50 it rotates with the drive shaft 41 until the pin 70 engages the shoulder 68 on the latch 64 as shown in dash lines in FIGURE 7 to limit its angular movement to a predetermined fixed amount of approximately 220°.

Simultaneously with the engagement of the neck of pin 70 with the latching shoulder 68 the enlarged button at its end engages a switch operator 71 for the limit switch 65 to deenergize the prime mover 32. The switch operator 71 is shown in FIGURE 3 as a roller at the end of an arm of a switch and offset with respect to the end of the pin 70, but it will be understood that when the driving shaft 41 and the timing disc 48 are moved axially to engage clutch 36 with spur gear 23 the button will overlie the switch operator. Thus, the carriage 6 and bankbook Bk mounted thereon are first manually moved to an initial adjusted position corresponding to a particular line of the bankbook Bk to be printed, after which the carriage and bankbook Bk are moved forwardly a predetermined fixed distance to a printing station S by the prime mover 32, driving mechanism 35, clutch 36 and spur gear 23 meshing with the rack teeth 22 on the carriage.

Printing mechanism including a platen 74 and adjacent type bars 75 are provided at the printing station S of a suitable construction, such as shown and described in the Buchsbaum et al. Patent 3,146,702, to print indicia on the bankbook Bk. This construction also includes a record tape Rt extending around a cylindrical platen 77 at the opposite side of the type bars 75 from the platen 74 While only one type bar 75 is shown in FIGURE 7, it will be understood that a plurality of such bars are arranged in side by side relationship and adjusted relative to each other to provide a row of type characters 75a and 75b at opposite sides thereof at the printing station S. The platen 74 is operated by an eccentric 78 on a print shaft 79 as controlled by an intermediate motion transmitting member 80 movable forwardly and rearwardly between the eccentric and platen. Operation of the platen 74 by the eccentric 78 presses the bankbook Bk against the type bars 75 and prints indicia on the bankbook.

Each time the print shaft 79 is rotated suitable linkage oscillates the rock shaft 66 to release the latching shoulder 68 from engagement with the latch pin 70, and oscillate the pawl 81 to index the spur gear 23 through a distance of one tooth corresponding to one line on the handbook Bk to be printed. A second pawl 82 is provided at the right hand side of the spur gear 23 as viewed in FIGURE 3 for engaging a ratchet 83 at the side of the gear for indexing the latter a predetermined increment of movement when the center of the bankbook Bk is at the printing station. The mechanism for operating the print shaft 79, platen 74 and indexing pawls 81 and 82 are not described in detail herein, but are shown and described in the Buschbaum et al. patent, referred to above.

After a printing operation has been completed a return switch is operated by a button on unit console 2, or a moving part of the printer to energize the electric motor 32 and cause it to rotate in the opposite direction from that previously described. The carriage 6 is then returned to its initial fully retracted position by a reverse operation. Motion is transmitted from the prime mover 32 through the reduction gear train 35, drive shaft 41, clutch 36, spur gear 23 and rack teeth 22 to move the carriage 6 and bankbook Bk rearwardly. During such rearward movement the pin 70 on the timing disc 48 engages a cam surface 84 on the rearwardly projecting latching arm 67 to clear the shoulder 68. As the carriage 6 moves rearwardly and approaches its initial position the pin 61 projecting therefrom engages the cam surface 60 on the locking bar 55 to rock it counterclockwise as viewed in FIGURE 6 and raise its locking lug 57 out of the path of the clutch element 36. Simultaneously, the arcuate end 58 of locking bar 55 engages pin 63 on indexing pawl 81 to hold it out of engagement with the teeth of spur gear 23. Carriage 6 engages an abutment, not shown, at the end of its movement to its fully retracted position, which, in turn, stops rotation of the drive shaft 41. The inclined teeth of the helical gears 39 and 40 then produce a thrust on the drive shaft 41 to move it axially from the position illustrated in FIGURE 5 back to the initial position illustrated in FIGURE 4 to disengage the clutch 36. If at any time during such axial movement of the shaft 41 the flange 59a of detent 59 is not aligned with the notch 49 in the timing disc 48, the detent 59 rocks on its pivot pin 52, as shown in dash lines in FIGURE 8 until the flange and notch are aligned at which time the spring 53 rocks the flange of the detent into the slot to the full line position illustrated in FIGURE 8. At the end of the axial return movement of shaft 41 a second limit switch 87 is actuated to stop the motor 32. As shown most clearly in FIGURES 3 and 8, a pin 86 on the timing disc 48 engages a loosely mounted actuator 88 depending from the end of a pivoted lever 89 between the pin and switch.

During the last increment of rearward movement of carriage 6 the arm 28 of the clamp 26 engages the cam 29 to rock the clamp upwardly and release the bankbook Bk. Thus, the parts are returned to their initial position and are ready to perform another transaction.

FIGURE 9 illustrates a simplified electric circuit for controlling the motor 32 for driving the carriage 6. The unit 2 may be used to consumate a single transaction such as depositing or withdrawing money, or a multiple transaction such as depositing money and adding interest. Certain of the buttons on the unit 2 are depressed to instruct the machine to perform these transactions and a manual switch 9 is depressed to initiate operation. After the transactions are completed a manual switch may be provided for returning the carriage to its fully retracted position, but usually a control switch is actuated from an impulse from a memory storage device or even from the printer itself which will reverse the operation of the carriage. For purposes of illustration the switch 9 is shown as a single pole double throw for manual operation to one position to initiate operation and for either manual or machine operation to another position to automatically return the carriage after the transactions are completed.

As shown in FIGURE 9, by way of example, the pole 9a of switch 9 is connected to one side of a source 90 of alternating current. Contacts 9b and 9c of switch 9 are connected to one end of the reversing windings 91 and 92 of a split phase alternating current motor 32 through conductors 93 and 94. The opposite ends of the motor windings 91 and 92 are connected together and to the opposite side of the source of alternating current 90 through a conductor 95. Switch 65 for stopping motor 32 and the forward movement of carriage 6 is shown in conductor 93, while switch 87 for stopping the motor and rearward movement of the carriage is shown in conductor 94. For purposes of illustration the switches are shown as operated by cams which, in the actual embodiment, are the pins 70 and 86 projecting from opposite sides of the timing disc 48. An electric condenser 96 is connected between the conductors 93 and 94. One form of the invention having now been described in detail the mode of operation is explained below.

Assuming for purposes of description that the carriage 6 of the present invention is used in a printer 4 for use in savings banks. When a customer has a transaction to be performed, such as depositing money, he submits his bankbook B*k* which is placed on the carriage 6 in an open position with its side edges over the retaining flanges 15 and 16 and its forward end abutting the clamp 26 in its upright position shown in dash lines in FIGURE 2. The open side of the book then faces upwardly and the area of the book to be printed overlies the opening 14 in the carriage 6. The carriage 6 is moved forwardly manually until the next available line on the bankbook B*k* is positioned in the window opening 7 and aligned with the index mark 8. During the initial movement of the carriage 6 the clamp 26 is released and operated by spring 27 to clamp the bankbook to the carriage. The transaction to be performed is then punched on the keyboard 3 and the start button 9 is depressed.

Depressing the start button 9 closes a circuit to the electric motor 32 which operates through the reduction gear train 35 tending to rotate the shaft 41. However, the flange 50a of detent 50 is in engagement with the notch 49 in the timing disc 48 which prevents rotation. Thus, the inclined teeth of the helical gears 39 and 40 produce an axial thrust on shaft 41 to move it to the right, as viewed in FIGURE 4, and thereby move the clutch 36 into clutching engagement with the spur gear 23, as shown in FIGURE 5. During such axial movement of the drive shaft 41, the timing disc 48 slides clear of the detent 50 and releases the shaft for rotation. The reduction gearing 35 then rotates the shaft 41 and the spur gear 23 clutched thereto acts on the rack teeth 22 to advance the carriage 6 a predetermined fixed distance from the position in alignment with the index mark 8 shown in full lines in FIGURE 7 to a printing station S as shown in dash lines in said FIGURE 7. This movement of the carriage 6 is controlled by the engagement of the pin 70 on the timing disc 48 with the latch shoulder 68 on the latch 64.

The printing shaft 79 then rotates the eccentric 78 which acts through the intermediate motion transmitting element 80 to move the platen 74 against the bankbook B*k* and press it against the type faces on the printing elements 75 and thereby print indicia at the proper line in the book. After a printing operation the rock shaft 66 is oscillated to release the latching shoulder 68 engaging the pin 70 and oscillate the indexing pawls 81 and 82. Pawl 81 advances the carriage 6 a distance corresponding with one line space on bankbook B*k* where indicia of another transaction is to be printed such as, for example, adding interest. This information is punched into the keyboard 3 and the printer operated to print indicia on the next adjacent line in the book.

If at any time the fold or crease portion of the bankbook B*k* is presented at the printing station S the ratchet 83 is then located at a position where it is engaged by the pawl 82 to move the bankbook through an additional increment of movement.

After all transactions are completed and the record printed on the bankbook B*k* and record tape R*t* a control switch 9 is actuated to energize reversing winding 92 of the electric motor 32 to drive it in the opposite direction. The motion of the motor 30 is transmitted through the reduction gearing 35, drive shaft 41 and clutch 36 to rotate the spur gear 23 and move the carriage 6 rearwardly. Adjacent the end of its rearward movement, the pin 61 on the carriage engages the cam 60 on the locking bar 55 to rock the lug 57 upwardly out of the path of movement of the clutch element 36. At the end of the rearward movement of the carriage to its fully retracted position it engages an abutment to prevent further rearward movement which produces an axial thrust on the shaft 41 to move it axially and disengage the clutch 36. During such axial movement the holding detent 50 may rock on its pivot pin 52 against the action of the spring 53 until it aligns with the notch 49 in the timing disc 48 and moves into the notch to prevent further rotation of the shaft 41 at the fully retracted position of the carriage 6. Simultaneously, switch operator 86 acts through the element 88 to actuate limit switch 87 and stop the motor 32.

It will now be observed that the present invention provides an improved construction and arrangement of elements in a printer which facilitates the location of a document to be printed. It will still further be observed that the present invention provides a carriage for use in a printer which permits unrestricted movement of a carriage to an adjusted position to insure proper positioning of the book and uniformity of printed lines and eliminates any danger of pinching the operator's finger. It will still further be observed that the present invention provides an improved carriage for use in printing which is of simple and compact construction, flexible in operation and one which is reliable in operation.

While a single embodiment of the invention is herein illustrated and described, it will be understood that changes may be made in the construction and arrangement of the elements without departing from the spirit or scope of the invention. Therefore, without limitation in this respect the invention is defined in the following claims.

What is claimed is:

1. A printer for printing indicia on a flat record sheet, a printing station, a carriage for the record sheet to be printed and mounted for sliding movement through the printing station, said carriage being normally positionable under manual control, a prime mover, driving mechanism connecting the prime mover to the carriage for moving the latter to the printing station, said driving mechanism having a normally disengaged clutch, means operative when the carriage has been manually moved to an adjusted position corresponding to a particular line on the record sheet to be printed, means for initiating operation of the prime mover, means responsive to prime mover actuation for engaging the clutch to connect the driving mechanism to the carriage, and means for stopping the carriage after a predetermined fixed increment of movement by the driving mechanism to align the particular line on the record sheet with the printing station.

2. A printer in accordance with claim 1 in which the driving mechanism comprises rack teeth on the carriage, a spur gear meshing with the rack teeth and the clutch engaging the spur gear.

3. A printer in accordance with claim 2 in which the driving mechanism comprises a shaft, the clutch element being mounted fast on the shaft, and means operable by the prime mover for actuating the shaft axially to engage the clutch with the spur gear prior to rotation.

4. A printer in accordance with claim 3 in which a pivoted locking bar engages the clutch element to hold it engaged with the spur gear and means actuated by the carriage adjacent its fully retracted position to rock the locking bar to release the clutch.

5. A printer in accordance with claim 3 in which the means operated by the prime mover for actuating the shaft axially comprises a helical gear on the shaft and an intermeshing helical gear driven by the prime mover, a timing disc on the shaft and having a notch in its periphery, a detent engaging the notch in the timing disc to produce an axial thrust on the shaft as it is driven by the helical gear, and said disc sliding off the detent after a predetermined increment of axial movement of the shaft to release the shaft for rotation.

6. A printer in accordance with claim 2 comprising type faces arranged in a line at the printing station a platen for moving the sheet into printing engagement with the type faces and indexing mechanism for engaging the teeth of the spur gear to advance the carriage a distance of one tooth corresponding to one line of printing on the sheet after each operation of the platen.

7. A printer in accordance with claim 1 in which the prime mover is an electric motor, the driving mechanism comprising a drive shaft, switch means including a manually operable switch for starting the motor, a limit switch for stopping the motor, and a timing element on the drive shaft for automatically operating the limit switch.

8. A printer in accordance with claim 7 in which the timing element on the shaft is a disc and pins projecting from said disc, a latch adjacent the disc, said limit switch and latch being engaged by at least one of said pins to accurately position the carriage at the printing station.

9. A printer in accordance with claim 8 in which the electric motor is a reversible motor, the switch means including a switch for starting operation of the motor in a reverse direction, a second limit switch for stopping operation of the motor at the end of the return movement of the carriage to a fully retracted position, a locking bar pivotally mounted on the frame and having one end overlying the side of the clutch to hold it engaged and a cam at its opposite end, a pin on the carriage engaging the cam on the locking bar to move the locking bar to a clutch releasing position, said driving mechanism having intermeshing helical gears to move the shaft and clutch to releasing position when the carriage is fully retracted, and the timing element on the drive shaft having a switch operator for automatically actuating the second limit switch to stop the motor.

10. A printer for printing indicia on a flat record comprising:
 print means;
 a carriage adapted to receive and hold the record, said carriage being mounted to be moved past said print means and being normally positionable under manual control;
 a prime mover;
 means operated when said carriage has been normally moved to a desired starting position for energizing said prime mover;
 a normally disengaged clutch connecting said prime mover to said carriage;
 means responsive to the energizing of said prime mover for engaging said clutch to connect the carriage to be moved toward the print means by the prime mover; and
 means operatable when the carriage has been advanced a predetermined fixed distance to a desired printing position for stopping the carriage.

11. A printer of the type described in claim 10 wherein said clutch engaging means includes:
 a pair of meshing helical gears one of which is fixed to said prime mover;
 a laterally movable shaft connecting the other of said helical gears to said clutch; and
 means for inhibiting the rotation of said shaft until said shaft has been laterally displaced a sufficient amount by the interaction of the helical gears to fully engage said clutch.

12. A printer of the type described in claim 10 wherein said carriage stopping means includes:
 means for detecting when said shaft has been rotated a predetermined number of degrees from its initial position; and
 means responsive to said detecting means for deenergizing said prime mover.

13. A printer of the type described in claim 10 including:
 means for energizing the prime mover to drive the carriage, through the engaged clutch, to a home position;
 means for stopping the carriage at its home position; and
 means including in part said clutch engaging means, responsive to the stopping of the carriage for disengaging the clutch.

References Cited
UNITED STATES PATENTS

| | | | |
|---|---|---|---|
| 2,297,743 | 10/1942 | Carroll et al. | 197—127 X |
| 2,884,851 | 5/1959 | Werner et al. | 101—93 |
| 3,115,963 | 12/1963 | Harbor et al. | 197—127 |
| 3,139,169 | 6/1964 | Wagemann | 197—127 |
| 3,146,702 | 9/1964 | Buchsbaum et al. | 101—93 |
| 3,211,272 | 10/1965 | Holladay et al. | 197—127 |

WILLIAM B. PENN, *Primary Examiner.*